Sept. 6, 1966　　D. C. KALBFELL　　3,271,692

DIFFERENTIAL AMPLIFIER AND COMMUTATOR SYSTEM

Filed March 15, 1962　　3 Sheets-Sheet 1

INVENTOR.
DAVID C. KALBFELL

BY George E. Pearson

ATTORNEY

Sept. 6, 1966 D. C. KALBFELL 3,271,692

DIFFERENTIAL AMPLIFIER AND COMMUTATOR SYSTEM

Filed March 15, 1962 3 Sheets-Sheet 2

INVENTOR.
DAVID C. KALBFELL
BY
George E. Pearson
ATTORNEY

INVENTOR.
DAVID C. KALBFELL
BY
George E. Pearson
ATTORNEY

United States Patent Office 3,271,692
Patented Sept. 6, 1966

3,271,692
DIFFERENTIAL AMPLIFIER AND COMMUTATOR SYSTEM

David C. Kalbfell, 941 Rosecrans St., San Diego, Calif.
Filed Mar. 15, 1962, Ser. No. 179,878
4 Claims. (Cl. 330—69)

This invention relates generally to the amplification and commutation of small differential voltages in the presence of large common mode voltages. This problem is frequently encountered in the measurement of voltages from thermocouples, strain gauges, and other sensors utilized in modern data acquisition systems. The common mode voltages appear whenever the voltage sources are located remotely from the data collection center, and there exists a difference in the ground potentials at the two locations, and other common mode voltages are sometimes introduced from transistor circuitry employed.

The prior art includes amplifiers which are designed to suppress the common mode voltage component in favor of the differential voltage which contains the desired intelligence, but these fall short of the ideal in several important respects: (1) they become overloaded if the common mode voltage component is more than a few volts; (2) their input impedance and leakage impedance to ground are too small to give the desired degree of common mode rejection in the presence of unbalanced source resistance; (3) they feed an appreciable currentback into the source which produces an erroneous offset of the zero point depending upon the source resistance, which may vary during a test.

In the prior art, when an electronic commutator is employed in conjunction with a differential amplifier, further errors are introduced for the following reasons: (1) the transistor switches used as gates do not remain perfectly balanced in the "on" condition, and some additional offset current is fed back through the source producing an error depending upon the source resistance; and (2) the various voltage sources may have different ground potentials, and large circulating currents are set up in the shielded cables when these shields are all tied together at the data collection center. A cable shield which is carrying current will have a voltage gradient along its length, and hence cannot properly perform its function of an electrostatic shield as will be illustrated below.

My invention makes it possible to build a single channel amplifier or a commutator system which overcomes these problems. The first novel feature is a "voltage holding capacitor" used in conjunction with a sampling switch at the input of the amplifier and a synchronized sample-and-hold circuit at the output of the amplifier. This makes the voltage holding capacitor become a virtual source having zero resistance and the effects of unbalanced line resistance disappears. At the same time, this method makes it practical to do an extremely effective job of shielding in the most sensitive areas. The effective magnitude of common mode voltages is reduced at least an order of magnitude, so that an ordinary transistorized differential amplifier can cope with earth potentials of 100 volts or more.

In the commutator version of my invention, the voltage holding capacitor is again used advantageously as before, and the output sample-and-hold circuit may likewise be used advantageously when the number of channels being handled is relatively small. An additional feature of my invention is now brought into play in the commutator, however, to cope with the problem of different earth potentials for the various voltage sources. Instead of using a double pole switch to interrupt both lines from the voltage source, a triple pole switch is employed to interrupt the shield circuit, in addition to the two data lines. This third "arm" on the switch need not be so perfect as the others in regard to small zero offset and extremely low saturated resistance, but it still performs a valuable function in eliminating the circulating currents between shields. At any instant, the shield from only one voltage source can be connected to the local ground at the data collection center.

We see, then, that my invention has four principal parts: (1) a voltage holding capacitor; (2) an input line switch; (3) an output sample-and-hold circuit; and (4) a shield switch. In a single channel amplifier, the first three are used jointly. In a commutator, the third becomes optional, depending upon the number of channels as noted above. The fourth will generally be needed to cope with the problem of circulating shield currents which cannot be handled by the first three.

An object of the invention in a differential amplifier system, whether single or multiple channel, is to provide new and improved methods and means for measuring true differential voltage in the presence of spurious signal effects due to common mode voltages and/or amplifier back currents.

Another object in a commutator amplifier system resides in the provision of new and improved methods and means for eliminating the effects of common mode voltage errors due to voltage gradients in the cable shields of such a system.

A further object in a differential amplifier system is to reproduce the signal source as a virtual zero resistance source at or near the input of the amplifier.

Still other objects, features and advantages of the present invention will become more fully understood from the following discussion of the prior art and description of the best mode thus far devised for practicing the principles thereof, reference being had to the accompanying drawings wherein.

The following discussion will show quantitatively how serious are the problems faced by prior art equipment, and will show how the application of my techniques eliminates these problems.

Figure 1:
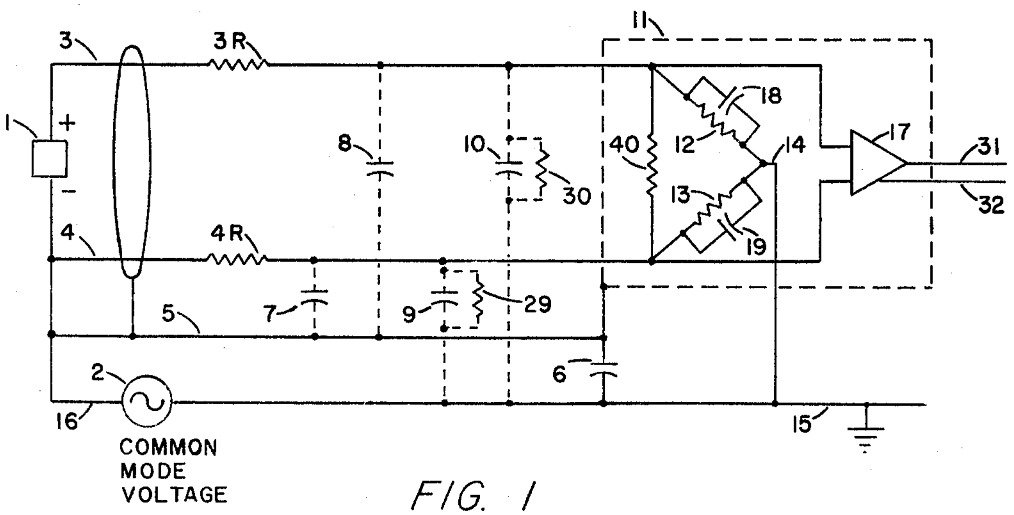
FIG. 1 is a block diagram of a prior art differential amplifier system depicting the limitations thereof.

FIG. 1 is a block diagram of a single thermocouple (or other sensor) connected to an ordinary differential amplifier by a shielded cable, and illustrates the common mode voltage problem. The commutator has not yet been inserted in this figure. The sensor signal 1 represents the electromotive force of a thermocouple, and is the voltage which we desire to measure accurately without interference from the common mode voltage 2. The connecting cables 3 and 4 will generally have different resistances 3R and 4R since they would be made of different metals as thermocouple extension cables. In a severe case, their resistances might differ by 1000 ohms, and the following discussion will be based on that assumption. The common mode voltage 2 is developed between the local ground 16 of the thermocouple and the local ground 15 of the amplifier. The common mode voltage between grounds 15 and 16 usually consists mainly of 60 c.p.s., but may also contain direct current and 400 c.p.s. components in addition to noise. If it were possible to connect these two grounds with a zero resistance wire, much of the problem would disappear, but this is usually impractical to accomplish.

The conductors 3 and 4 are enclosed in a shield 5 which is tied to the thermocouple ground. In order to be effective as a shield, 5 must be an equipotential surface and must not be expected to carry large currents. In particular, its resistance must be small compared to the reactance of the various capacitances which may feed current into this shield. In practice, this condition is usually easy to meet. Capacitances 7 and 8 do no harm since the common mode generator 2 cannot cause current to flow through them as long as shield 5 has no voltage drop. Leakage admittances directly to ground such as 9, 10, 29, and 30 are very serious, however, since they close a loop for the common mode generator, and any current flowing through 9, 10, 29, and 30 will also flow through resistances 3R and 4R, causing different voltage drops, and this differential voltage will thereafter be indistinguishable from signal voltage derived from sensor 1.

A numerical example will clarify this point. Suppose that the common mode voltage is 2.5 volts, and that capacitances 9 and 10 are 10 pf. ($10^{-11}$ farads) each. Then at 60 c.p.s., a current of 0.01 microampere would flow through each capacitor, making an error signal of 10 microvolts in the 1000 ohms of difference between resistances 3 and 4 which we previously postulated. In a good data system, the *total* error should be no more than 10 microvolts, so extremely good shielding is necessary to minimize the unguarded capacitances 9 and 10. Resistances 29 and 30 must be greater than 250 megohms each, assuming infinite leakage resistance to ground at the amplifier.

Another problem arises in the amplifier which is enclosed in the shielded box 11, which in turn is tied to the shield of the input cable. The differential amplifier proper is designated 17, but its input circuit is shown separately with resistors 12 and 13 going to ground and 40 being the differential input resistance. These might be vacuum tube grid leaks or bias resistors for the input transistor stage. In order to keep the error below 10 microvolts (in the example above), resistances 12 and 13 must be more than 250 megohms each if 29 and 30 are infinite, and their associated shunt capacitances 18 and 19 must be very small. If the common mode voltage is 400 c.p.s., the capacitance requirements become correspondingly stiffer. In some cases, the magnitude of the common mode voltage is greater than 2.5 volts which also tightens the requirements.

These examples illustrate the great difficulty of obtaining accurate data in the presence of common mode voltage. The addition of a conventional transistorized commutator between the sensors and the amplifier compounds the problems by affording additional opportunities for unguarded capacitance and leakage resistances to enter the system, while certainly doing nothing to reduce the requirements on the amplifier.

When using a conventional commutator with a number of sensors which have different common mode voltages, each connected with a two conductor shielded cable, large currents are caused to flow in these shields when they are all tied together at the commutator. These shield circulating currents cause voltage gradients to appear from one end of the shield to the other, and currents can then flow through internal capacitances 7 and 8. Although the potentials existing in the shields would usually be small, the capacitances 7 and 8 are very large, so that appreciable errors easily appear.

The amplifier 17 will usually be of a type which feeds some current back through the sensor, and transistor commutating switches which will be placed between the sensor and amplifier also add to this current. Assume the amplifier and the transistor switches to be balanced so well that this backward current is only 0.01 microampere. If 3R and 4R total 1000 ohms, then even this tiny current would produce an error voltage of 10 microvolts which is our specified limit of *total* error. In some contemporary commutating and amplifying systems, a zero offset voltage is introduced to cancel this error, but there is still a major problem in maintaining so critical a balance in the face of varying environment and varying sensor resistance. Capacitor 6 represents the inevitable capacitance between shielded enclosure 11 and local ground 15. This need not be extremely small, providing that, at the highest frequency of interest in the common mode voltage generator 2, the reactance of capacitor 6 is small compared to the resistance of shield 5.

Figure 2:
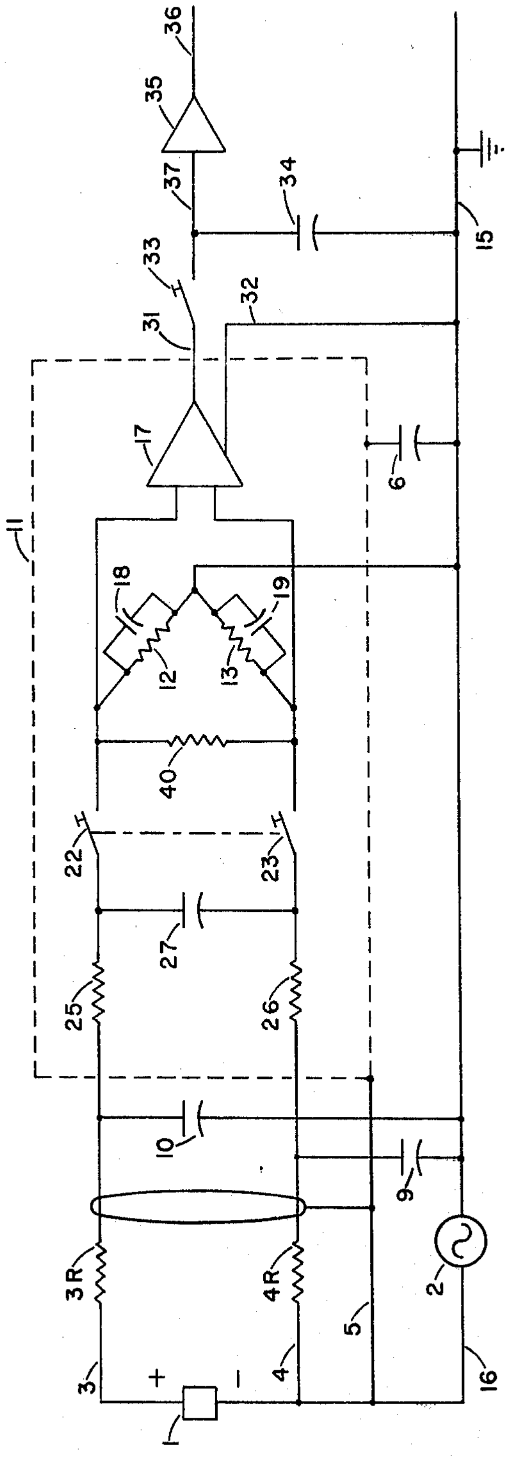
FIG. 2 is a block diagram of a single channel differential amplifier system featuring the voltage holding concept of avoiding the limitations of prior art systems.

FIG. 2 illustrates the application of my invention to a single channel amplifier in order to reduce the effects of common mode voltage and of current which is fed back into the source by the amplifier. It is similar to FIG. 1 with the same numbers on corresponding parts. The shielded enclosure 11 is now expanded to enclose the voltage holding capacitor 27 and switches 22 and 23.

Voltage holding capacitor 27 develops a voltage which is substantially that of voltage source 1, and is quite independent of common mode voltage effects because it can be shielded very effectively. As the capacitor approaches its equilibrium voltage, its charging current becomes infinitesimal, and voltage drop in line resistances 3R and 4R become negligible. Unless voltage source 1 changes very rapidly, the charging currents will remain small.

Switches 22 and 23 will generally be made with transistors, and there will be some current fed backward into capacitor 27 during the time the switches are closed, but none when they are open. Since the switches are closed for only a very short time, any backward current from switches 22 and 23 and amplifier 17 will not be able to deposit enough charge on capacitor 27 to effect its voltage appreciably, if the capacitor is large enough.

When switches 22 and 23 are actuated to sample the voltage of sensor 1, the amplifier actually samples the voltage across capacitor 27. During the sampling period, capacitor 27 will discharge into the input resistance of the amplifier, and will also tend to be recharged from the sensor. However, if the sampling period is very short compared to the RC time constant of the capacitor 27 and the amplifier input impedance, then the voltage across capacitor 27 will be substantially constant during the sampling period.

Any backward current from the amplifier and the transistor switches 22 and 23 will also tend to charge or discharge capacitor 27, but this effect will also be negligible if these currents are reasonably small and if the sampling period is very short. It is noteworthy that the line resistance between the capacitor 27 and the amplifier is very small, so that the backward current cannot cause any line voltage drop as it would if flowing through the sensor instead of the capacitor 27. Thus the backward current problem is eliminated when the sampling period is short.

Switches 22 and 23 are closed periodically for a time short compared to the intervals between closings, so that capacitor 27 is connected to the voltage source 1 for all of the time, and is only briefly connected to amplifier 17. Since the voltage source 1 varies as a function of time, the RC time constant of the input circuit is significant, and places an upper limit on the value of capacitor 27 if its voltage is to track the voltage source 1 to a specified accuracy. A typical value for this time constant might be $\frac{1}{10}$ of the time between closures of the sampling switches 22 and 23. If the only resistance in the input circuit were 3R and 4R, the above criterion might require an inconveniently large value for capacitor 27, and so the optional resistors 25 and 26 may be added. Besides reducing the required value of capacitor 27, the presence of resistors 25 and 26 also tends to stabilize the total resistance of the input circuit in the face of varying values of 3R and 4R. An additional use for 25 and 26 is to compensate to a first degree for unbalance in the line resistances 3R and 4R to minimize the residual common mode voltage effects which depend upon an unbalance in source resistance.

The value selected for capacitor 27 must be a compromise between various factors: (1) it should be small in order to have a short time constant in following variations in voltage source 1; and (2) it should be large in order to avoid discharging significantly through resistors 12, 13, and 40 or charging from the backward currents of switches 22 and 23 and amplifier 17 during the sampling time. At first, it might appear that capacitor 27 would perform a filtering action to eliminate hum components in voltage source 1, but such filtering is usually negligible when a value for capacitor 27 is selected in terms of the above mentioned factors.

The following numerical examples will illustrate two ways in which the value of the voltage holding capacitor might be selected. In both cases, we will postulate a source resistance of 1000 ohms, a discharge time constant of 1000 times the sampling time to give less than 0.1% error, and a charging time constant of 1/10 of the time between samples. In the first case, I will start with the assumption that the sampling time is 10 microseconds, and the amplifier input resistance 40 is 1 megohm. Then the capacitor 27 must be greater than 0.01 mfd. to give a discharge time constant of 10 milliseconds or more. With a 1000 ohm source, this makes the charging time constant equal to 10 microseconds, and so the interval between samples must be at least 100 microseconds giving a maximum frame frequency of 10,000 frames per second, in a commutated system.

In the second example, start with the assumption that the frame frequency is 30 per second. If the charging time constant is 1/10 of the off time, this dictates that the charging time constant be less than 3 milliseconds. With a 1000 ohm source resistance, this means that the voltage holding capacitor must be less than 3 mfd. Now assume the amplifier input resistance 40 to be only 100,000 ohms. Then the sampling time must be less than 300 microseconds. These examples show that it is easy to find combinations of sampling time, frame frequency, voltage holding capacitor, and amplifier input resistance to permit accurate commutation.

These examples may be summarized in tabular form as follows:

$T_{on}=10$ microseconds
$R_{40}=1$ megohm
$C>0.01$ microfarad
$R_s=1000$ ohms
$R_cC>10$ microseconds
$T_{off}>100$ microseconds In the second case I start with the assumption of a frame frequency of 30 per second. Then $T_{off}=0.03$ second
$0.1T_{off}=3$ milliseconds
$R_s=1000$ ohms
$R_sC<0.1T_{off}$
$C<3$ microfarads
$R_{40}=100,000$ ohms
$R_{40}C=0.3$ second
$T_{on}<300$ microseconds To summarize the effectiveness of voltage holding capacitor 27, note that it cannot eliminate errors caused by current flow through leakage admittances such as those due to capacitances 9 and 10 ahead of shielded compartment 11 in FIG. 2 or shielded switching compartment 21 in FIG. 4; although it is physically practical to carry the shileded lines up to this point with very little unguarded admittance. The capacitor 27 has significant value however in that it reduces the effects of leakage admittances 12, 13, 18 and 19 associated with the input portion of the amplifier. These admittances are usually much larger than the cable leakages 9 and 10, and would produce the most serious errors if not offset by the very low effective source impedance of capaictor 27 and the copper wire leads (having low resistance) leading from the switches to the input of the amplifier proper.

The output of amplifier 17 consists of a series of short pulses whose amplitude is proportional to the voltage on source 1. In order to reconstruct a steady voltage from these pulses, I use the sample-and-hold circuit consisting of switch 33, capacitor 34, and buffer amplifier 35. Switch 33 is closed at approximately the same time as switches 22 and 23, so that capacitor 34 becomes charged to the potential of the output pulses of amplifier 17. In order to accomplish this in the short time available, amplifier 17 and switch 33 must have low output and throughput resistances respectively, and they must be capable of handling large enough currents to deposit the required amount of charge on capacitor 34 in the time available. Buffer amplifier 35 must have a high enough input impedance so that capacitor 34 will not discharge appreciably during the time interval between pulses. Generally, buffer amplifier 35 will have little voltage gain.

Figure 3:
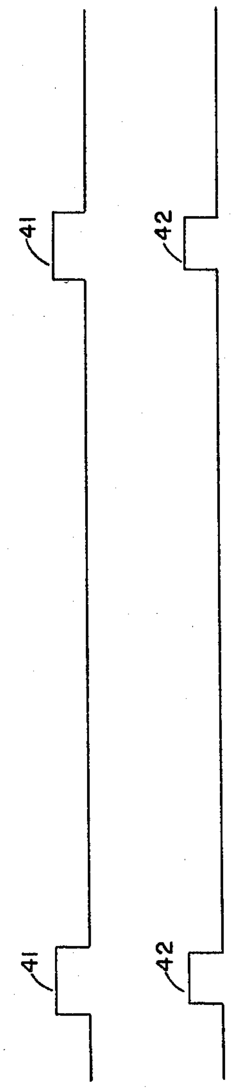
FIG. 3 is a timing diagram depicting the sampling operation of the amplifier system of FIG. 2.

It is advantageous to have switch 33 closed for slightly shorter interval than switches 22 and 23 in order to avoid the inevitabile transients appearing at the output of amplifier 17 due to imperfections in the leading and trailing edges of the operation of switches 22 and 23, and due to the finite rise time of amplifier 17. This is illustrated in the time diagram of FIG. 3, in which 41 indicates the closing times of switches 22 and 23, while 42 indicates the closing times of switch 33.

Figure 4:
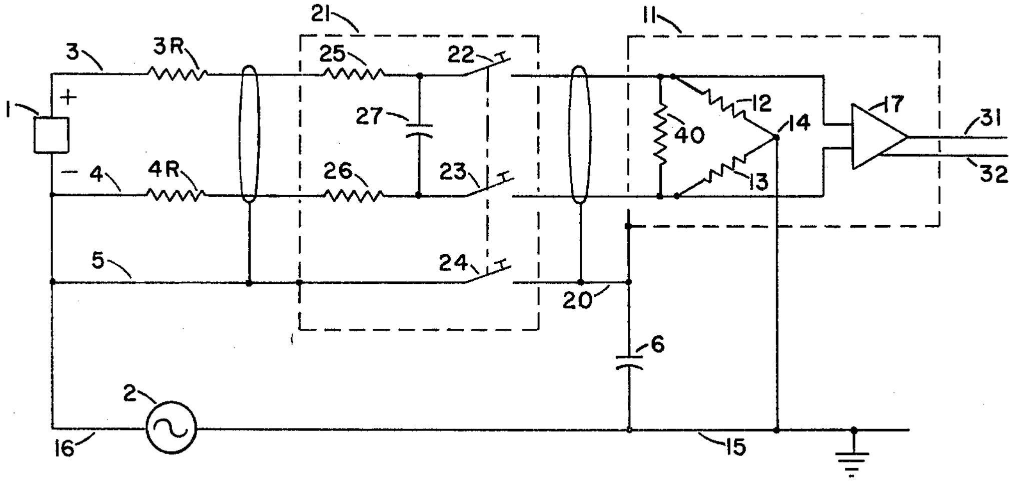
FIGS. 4 and 5 are block diagrams of single and multiple channel commutator-amplifier systems featuring the voltage holding capacitor and shield switching concepts of the present invention.

FIG. 4 illustrates my method of commutating without increasing common mode problem, and my method also decreases the requirements on the amplifier 11. One section of the commutator is shown in shielded compartment 21. Such a section is needed for each sensor, but the outputs of all of the boxes like 21 tie together into a single amplifier 11. The commutator section 21 contains three switches 22, 23, and 24 which would usually be transistors in a practical system. 22 and 23 switch the signal lines in the conventional manner, and 24 switches the shield. This means that only one shield is connected to amplifier box 11 at any one time, and circulating currents through the shields due to differences in common mode voltages are eliminated.

Shield 20 of the line running from the commutator switch to the amplifier is tied to the amplifier shielded enclosure 11. Each commutator section has a shielded line like 20 running to the amplifier enclosure. However, only that commutator section which is activated at any given time will be connecting the amplifier enclosure 11 to its individual channel shield 5. Since the various channel shields 5 are never tied together, circulating currents cannot be set up from local differences in sensor ground potentials.

Emphasis has been placed on the importance of using a sampling period which is short compared to the time between samples. In the single channel case, this required a sample-and-hold circuit in the output of amplifier 17 in order to make the output signal continuously significant. In the case of a large commutator having many channels, this sample-and-hold circuit would be unnecessary, since the dwell time on any one channel would be small compared to the time between samples of that channel. The output of amplifier 17 would then be a modified stairstep waveform jumping from one level to another as successive data channels were sampled.

Figure 5:
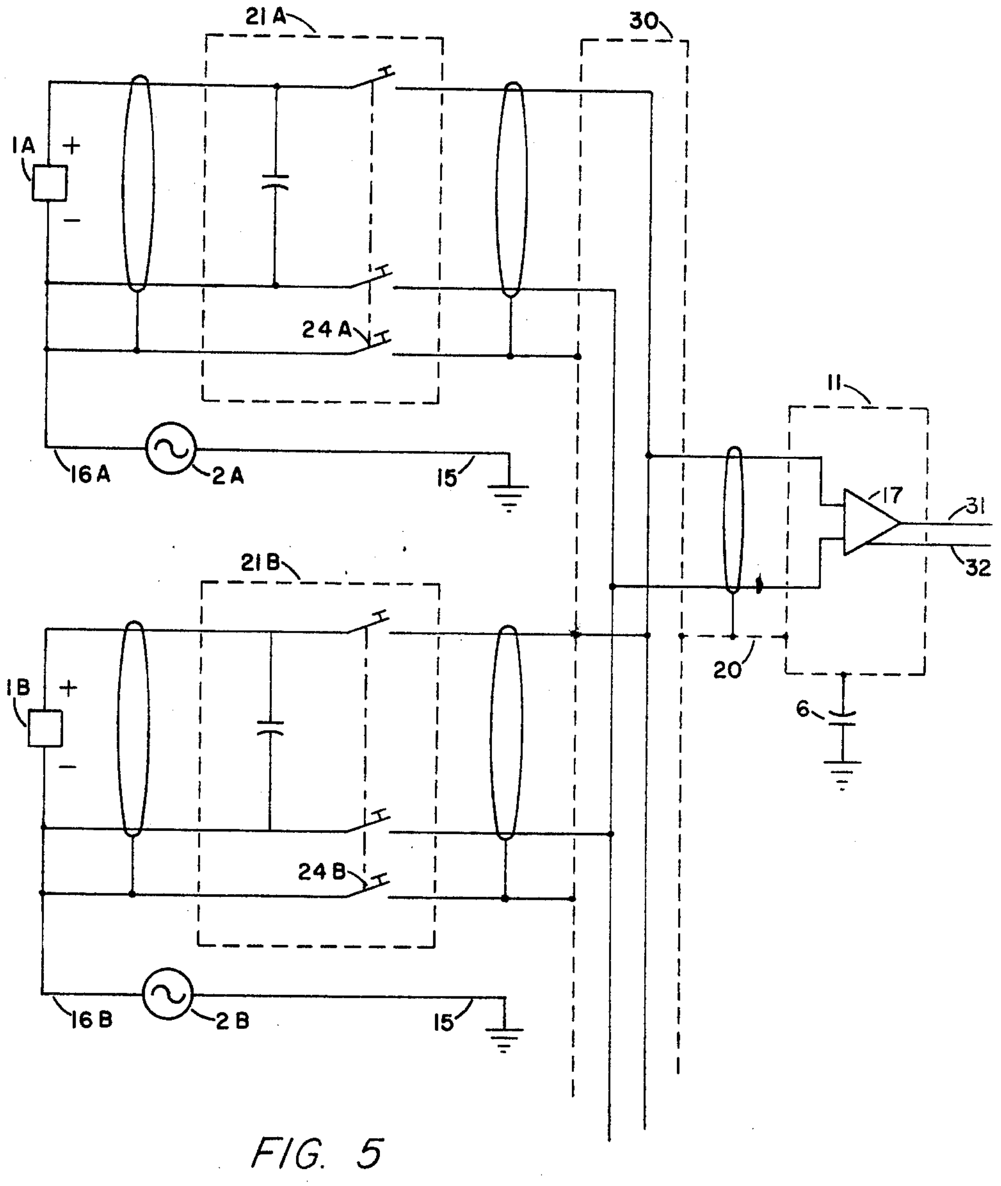

FIG. 5 illustrates the connection of several commutator sections to a single amplifier. The local ground at the amplifier is designated 15 and the common mode ground potentials with respect to 15 are designated 2A, 2B, etc. For convenience, the outputs of the various switch sections are tied together in a junction box 30 which is connected to amplifier enclosure 11, and to the shields of the lines running from the individual switch enclosures 21A, 21B, etc. to junction box 30. The output sides of all of the shield switches 24A, 24B, etc., are also connected to this junction box.

From the foregoing it should now be apparent that method and means have been disclosed for fulfilling the aforestated objects of the invention and while the same has been described with reference to certain examples thereof which give satisfactory results, it is my intention, in the appended claims to cover all such further examples, embodiments and methods commensurate with the scope of the invention.

What I claim is:

1. In a commutation system, means for measuring true differential signal voltage in the presence of common mode voltage and amplifier back current comprising, in combination, a plurality of differential signal sources, a plurality of shielded two conductor lines each having one of said signal sources connected across the terminals at one end thereof, a plurality of capacitors, each of said conductor lines having one of said capacitors connected across the terminals at the other end of the line, each said capacitor continuously tracking and holding the signal voltage produced by the signal source connected across its line thereby to provide a virtual zero resistance source whereby spurious signal voltage effects due to impedances in the line are substantially avoided and the effective magnitude of the common mode voltages is reduced by at least an order of magnitude, a differential amplifier having two inputs and an output, and commutation means operable to connect said two conductor lines in sequence to said amplifier inputs each respectively at said terminals at said other end thereof thereby to connect said capacitors in sequence across said amplifier inputs whereby the capacitor held voltages are commutated into the amplifier and the amplified signal voltages appear in sequence across said amplifier output, said commutation means having a sampling period which is short compared to the time between samples thereby substantially to avoid depletion of said capacitor held voltages at the amplifier inputs while the same are being commutated into the amplifier, each of said capacitors having a value which lies between minimum and maximum values and providing a signal charging RC time constant which is short compared to said time between samples and a discharge RT time constant with respect to said inputs of the amplifier which is long compared to said sampling period.

2. In a commutation system as in claim 1, said signal charging RC time constant being less than one tenth of said time between samples, and said discharge RC time constant being greater than one hundred times the time of said sampling period.

3. In a commutation system as in claim 1, each of said two conductor lines having added resistance inserted therein sufficient to stabilize the total resistance in the charging RC circuit of its capacitor, to compensate to a first degree for unbalance in the line resistance, and to permit reduction of the capacitance of its capacitor to a conveniently small value while retaining the desired value of the charging RC time constant.

4. In a commutation system as in claim 1, said amplifier having a shield and each of said two conductor lines having a shield, and said commutation means having switch means for connecting each said line shield to said amplifier shield as its line conductors are connected respectively to said amplifier inputs.

References Cited by the Examiner

UNITED STATES PATENTS

| | | | |
|---|---|---|---|
| 2,907,902 | 10/1959 | McIntosh et al. | 320—1 X |
| 3,040,263 | 6/1962 | Young | 330—10 |
| 3,079,568 | 2/1963 | Werth | 330—10 X |
| 3,088,076 | 4/1963 | Burwen | 330—9 |

FOREIGN PATENTS

| | | |
|---|---|---|
| 712,709 | 7/1954 | Great Britain. |

ROY LAKE, *Primary Examiner.*

NATHAN KAUFMAN, *Assistant Examiner.*